United States Patent [19]
Book

[11] Patent Number: 4,743,996
[45] Date of Patent: May 10, 1988

[54] ELECTRICAL DISTRIBUTION APPARATUS HAVING FUSED DRAW-OUT SURGE ARRESTER

[75] Inventor: William J. Book, Jefferson City, Mo.

[73] Assignee: Westinghouse Electric Corp., Pittsburgh, Pa.

[21] Appl. No.: 75,188

[22] Filed: Jul. 17, 1987

Related U.S. Application Data

[63] Continuation of Ser. No. 866,013, May 22, 1986, abandoned.

[51] Int. Cl.⁴ .................................... H02H 7/04
[52] U.S. Cl. .................................... 361/39; 361/38; 361/349; 337/31; 337/34
[58] Field of Search .................... 361/35, 38, 39, 40, 361/41, 124, 126, 127, 131, 347, 348, 349, 350, 357; 337/28, 31, 32, 33, 34

[56] References Cited

U.S. PATENT DOCUMENTS

| | | | |
|---|---|---|---|
| 1,988,683 | 1/1935 | Diehl | 361/39 |
| 2,918,557 | 12/1959 | Link | 337/194 |
| 3,313,983 | 4/1967 | Mallett et al. | 361/39 |
| 3,916,260 | 10/1975 | Westrom et al. | 361/41 |
| 3,953,818 | 4/1976 | Martin et al. | 361/41 X |

*Primary Examiner*—A. D. Pellinen
*Assistant Examiner*—H. L. Williams
*Attorney, Agent, or Firm*—D. R. Lackey

[57] ABSTRACT

Electrical distribution apparatus, such as a pad-mounted electrical distribution transformer, including an electrically grounded tank, an electrical element in the tank, and a draw-out surge arrester assembly which extends into the tank. The draw-out surge arrester assembly includes a housing, and a draw-out device removably disposed in the housing. The draw-out device includes a fuse connected in series with the surge arrester, between the electrical element and grounded tank, with the fuse being sized to isolate the surge arrester from the electrical element, should the surge arrester fail to recover properly from a voltage surge.

4 Claims, 3 Drawing Sheets

ELECTRICAL DISTRIBUTION APPARATUS HAVING FUSED DRAW-OUT SURGE ARRESTER

This application is a continuation division of application Ser. No. 06/866,013, now abandoned, filed May 22, 1986.

BACKGROUND OF THE INVENTION

1. Field of the Invention:

The invention relates in general to electrical distribution apparatus, such as pad-mounted electrical distribution transformers, and more specifically to electrical distribution apparatus having overvoltage or surge arresters.

2. Description of the Prior Art:

Co-pending application Ser. No. 799,040, filed Nov. 18, 1985, entitled "Electrical Distribution Apparatus Having Draw-Out Surge Arrester", now U.S. Pat. No. 4,679,113, discloses electrical distribution apparatus having a grounded metallic tank, and a surge arrester assembly. The surge arrester assembly includes an arrester housing which extends into the tank, and a draw-out device in the arrester housing which is removable therefrom. The draw-out device includes an over-voltage surge arrester connected between spaced electrical contacts. The arrester housing includes first and second insulatively spaced metallic end members, with the first metallic end member functioning as a mounting structure for mounting the arrester housing in a tank opening, and also as an electrical contact which automatically connects the first electrical contact of the draw-out device to the grounded tank. The second metallic end member of the arrester housing electrically connects the second electrical contact of the draw-out device to an electrical element within the tank to be protected against voltage surges.

SUMMARY OF THE INVENTION

Briefly, the present invention improves upon the electrical distribution apparatus disclosed in the co-pending application, by providing voltage isolating capability integral with the draw-out portion of the surge arrester assembly. According to the invention, a fuse, which is preferably of the expulsion type, is connected in series with the surge arrester blocks or non-linear resistors of the draw-out device. The electrical circuit from the grounded metallic tank to the electrical element within the tank to be protected, when the draw-out device is assembled with the arrester housing, includes a metallic mounting member at a first end of the arrester housing, a surge arrester, a fuse, and a metallic member at the spaced end of the arrester housing which is insulatively spaced from the arrester mounting member. Should the surge arrester fail to recover from a voltage surge and allow power frequency current to flow between the circuit element to be protected and the grounded tank, the fuse will operate to isolate the failed arrester from the system voltage. Thus, the surge arrester and fuse, being coupled together in the draw-out device, are easily inspectable and replaceable. The integral voltage isolaton is economical, as the tank does not have to be opened and entered to replace a separate internally mounted isolating fuse, and the more costly alternative to an internal fuse, e.g., a bayonet or drywell canister, are not required.

BRIEF DESCRIPION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
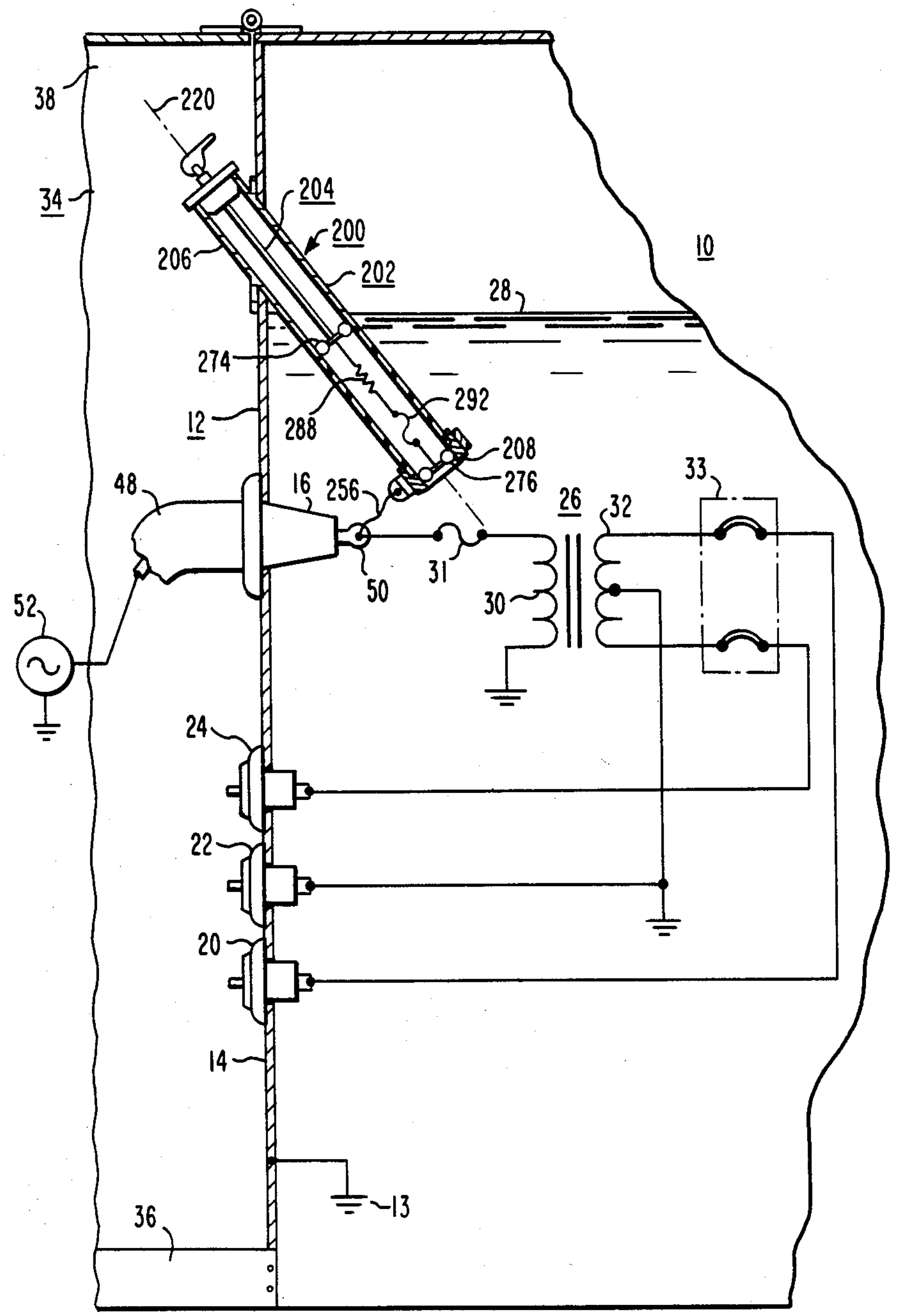
FIG. 1 is a fragmentary elevational view of a pad-mounted electrical distribution tranformer constructed according to the teachings of the invention.

The invention relates in general to any type of power frequency electrical distribution apparatus, single phase or multiple phase, having a grounded metallic casing or tank, which may require overvoltage surge protection, such as surge voltages due to lightning. Such apparatus includes electrical distribution transformers and electrical switches. For purposes of example, the invention will be described relative to a pad-mounted distribution transformer, such as used by electrical utilities to provide 60 Hz, 120/240 volts for residential use.

In order to limit the length of the present application, the hereinbefore mentioned U.S. Pat. No. 4,679,113 is hereby incorporated into the present application by reference. Elements in the present application which may be the same as in the incorporated application are identified with the same reference numerals.

While the dry-well concept of the co-pending application was the basis for the preferred embodiments described therein, when integral voltage isolation is provided in accordance with the teachings of the present invention, the wet-well concept is preferred. This is due primarily to economics, as the difference in cost and physical size between liquid immersed fuses and dry-type fuses is significant. For example, the liquid immersed fuse may be a small, low cost expulsion fuse, while a dry-type fuse would have to be a significantly larger and more costly current-limiting fuse.

Referring now to the drawings, and to FIG. 1 in particular, there is shown a fragmentary elevational view, partially in section, of a pad-mounted electrical distribution transformer 10 constructed according to the teachings of the invention. Transformer 10 includes an enclosed metallic tank 12 having a front wall or surface 14 on which the electrical terminals are mounted, such as high voltage bushing well 16 and low voltage bushings 20, 22 and 24. An additional high voltage bushing well would be provided for loop feed. Tank 12 is electrically grounded, as indicated at 13. A core-coil assembly 26 is disposed within tank 12, immersed in a suitable liquid dielectric 28, such as mineral oil. The core-coil assembly 26 includes a primary winding 30 which is connected to the high voltage bushing well 16. If desired, the primary winding 30 may be connected to the bushing well 16 via a protective link 31. The core-coil assembly also includes a secondary winding 32 which is connected to the low voltage bushings 20, 22 and 24. If desired, a circuit breaker 33 may be connected between the secondary winding 32 and the low voltage bushings. The circuit breaker 33 protects transformer 10 against external overloads and short circuits, while the protective link 31 operates due to an internal failure of the core-coil assembly.

A cabinet or compartment 34 is formed adjacent to the front wall 14 of tank 12, for enclosing the bushings, as well as the cables which rise from the ground and connect to the bushings. Cabinet 34 includes a sill 36 which is attached to the tank, and a terminal cover or hood 38 which is pivotally attached to the tank 12 and locked to the sill 36 when closed.

Figure 2:
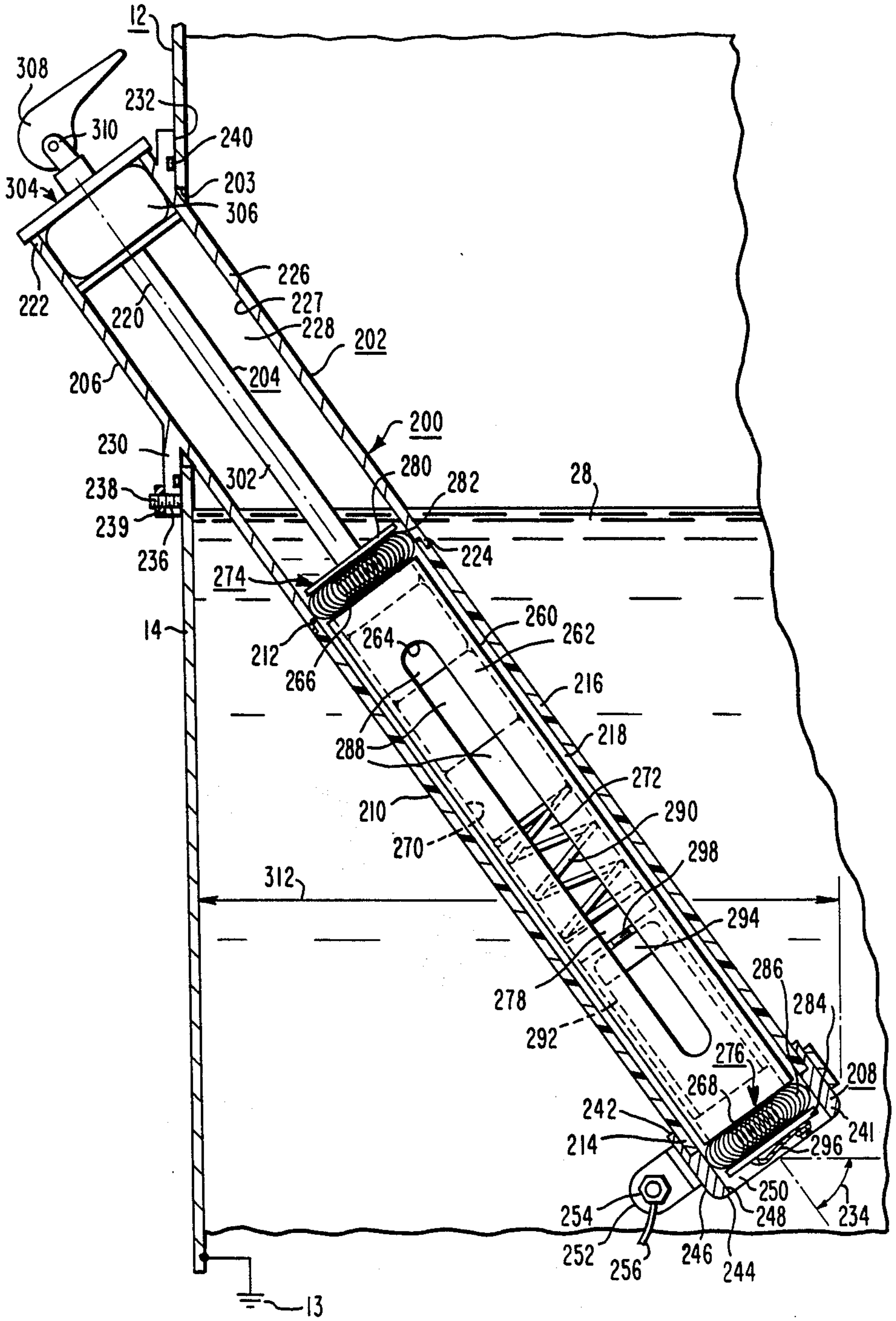
FIG. 2 is an elevational view, partially in section, of a preferred embodiment of the draw-out arrester assembly shown schematically in FIG. 1.

A surge arrester assembly is provided for each high voltage bushing well, such a surge arrester assembly 200 for high voltage bushing well 16. Bushing well 16 includes an insert and plug-in elbow 48, which completes an electrical circuit from a terminal 50 at the encased end of bushing well 16 to a source 52 of electrical potential. Terminal 50 is connected to the encased electrical element, i.e., to primary winding 30 of core-coil assembly 26. FIGS. 1 and 2 will both be referred to during the following description of surge arrester assembly 200, with FIG. 1 illustrating the surge arrester assembly with schematic elements, and with FIG. 2 illustrating a preferred embodiment of the surge arrester assembly 200.

Surge arrester assembly 200 includes an arrester housing 202, and a draw-out arrester portion 204. The arrester housing 202, in a preferred embodiment of the invention, is of the wet-well type, and it will be described in this context. Arrester housing 202, which extends into tank 12 via an opening 203 in wall 14, includes first and second insulatively spaced metallic end members 206 and 208, respectively. The electrical insulation for mounting and spacing the metallic end members 206 and 208 is provided by a tubular member 210 formed of a material suitable for the operating environment, such as a filament wound glass-filled epoxy. Tubular member 210 has first and second axial ends 212 and 214, respectively, and a wall portion 216 which defines an opening 218 having a longitudinal axis 220 which extends between its axial ends. Since this is a wet-well embodiment, tubular member 210 may have one or more openings in its wall portion 216; or, since the lower end of the arrester housing 202 will to be open for operation of an explusion fuse, as will be hereinafter explained, wall portion 216 may be solid.

The first metallic end member 206 is formed of a good electrical conductor, such as copper, aluminum, steel or brass, and is essentially a tubular member having first and second axial ends 222 and 224, and a wall portion 226 having an inner cylindrical surface 227 which defines an opening 228 which extends between its axial ends. Opening 228 is coaxial with the longitudinal axis 200.

Wall portion 226 is externally circumferentially flanged, having a flange 230 which includes a flat surface 232 which extends outwardly from wall portion 226 at a predetermined angle selected such that when the flat surface 232 of flange 230 is vertically oriented, the longitudinal axis 220 will be directed downwardly at a predetermined angle 234 from the horizontal, such as an angle of about 35 degrees, for example.

Flange 230 is mounted to wall 14 by any suitable means. For example, flange 230 may have a plurality of openings, such as opening 236, for receiving metallic stud members, such as stud member 238, which are welded to wall 14. Nuts, such as nut 239, secure flange 230 to the studs and tank. A circumferential groove in flange surface 232 receives an O-ring 240 for sealing the interface between flange 230 and tank 12 about tank opening 203. The second axial end 224 of the first metallic member may be suitably grooved for receiving the first axial end 212 of the insulating tubular member 210. An adhesive, such as an epoxy, may be used to secure the ends in coaxial alignment.

In addition to mounting the arrester housing 202 within opening 203 of tank 12, the inner surface 227 of the first metallic end member 206 functions as a first electrical contact which operates with an electrical contact on the draw-out portion 204, as will be hereinafter explained. The metallic end portion 206 also electrically connects the first electrical contact defined by surface 227 to the grounded metallic tank 12, or a separate grounding strap may be used.

The second metallic end member 208 functions as an electrical contact for opening a second contact on the draw-out arrester portion 204, it provides support for a terminal adapted for connection to the portion of an electrical circuit within tank 12 to be protected against overvoltage surges, and it defines an opening which enables the liquid dielectric 28 to flow freely into the arrester housing, as well as an opening for enabling proper operation of an explusion fuse carried by the draw-out portion 204 of the surge arrester assembly 200.

More specifically, the second metallic end portion 208 may include a tubular metallic member 241 constructed of a good electrical conductor. Member 241 includes first and second axial ends 242 and 244, respectively, and a wall portion 246 having an inner surface 248 which defines an opening 250 which extends between its ends. Opening 250 is coaxial with longitudinal axis 220, with the inner surface 248 which defines opening 250 functioning as a second electrical contact of arrester housing 202. Opening 250 also allows flow of the liquid dielectric 28 into the arrester housing 202, as well as the opening which enables proper operation of a fuse carried by draw-out portion 204.

A clamp 252, formed of tin plated steel, for example, is slipped over the outer surface of tubular member 421, and firmly clamped in this position by a suitable nut and bolt combination 254. Combination 254 secures one end of an electrical lead 256, the other end of which is connected to the circuit point to be protected such as to terminal 50 of bushing well 16, which thus protects primary winding 30 against voltage surges which attempt to enter the associated end of the primary winding.

The draw-out surge arrester portion 204 of the assembly 200 includes an insulative tubular member 260 which may be similar in construction to tubular member 210. Tubular member 260 includes a wall portion 262 which may be solid; or it may have one or more openings, such as opening 264, for allowing visual inspection of the components mounted therein. Tubular member 260 includes first and second axial ends, 266 and 268, respectively, and an inner cylindrical surface 270 which defines an opening 272 which extends between its axial ends.

First and second metallic electrical contact assemblies 274 and 276 are provided at the first and second ends 266 and 268, respectively, of tubular member 260, and an intermediate metallic electrical contact 278 is provided intermediate the ends of the tubular member, within opening 272. Contact assemblies 274, 276 and 278 are constructed to permit free flow of liquid dielectric 28 into the tubular member 210. For example, the first and second electrical contact assemblies 274 and 276 may each include a metallic spool-like member and a garter spring contact encircling the trough defined by the spool-like structure, such as the metallic member 280 and the garter spring contact 282 associated with the first electrical contact assembly 274, and the metallic member 284 and garter spring contact 286 associated with the second electrical contact assembly 276. Garter spring contacts 282 and 286 make electrical contact with the inner surfaces 227 and 248 of the first and second metallic members 206 and 208, respectively, of the arrester housing 202, when the draw-out portion 204 is inserted into housing 202, without blocking flow of liquid dielectric 28.

Draw-out surge arrester portion 204 is of the gapless type, at least in the preferred wet-well embodiment, having the requisite number of non-linear resistive elements or blocks 288, such as zinc-oxide. The number of blocks 288 depends upon the normal voltage level of the circuit point to be protected. The non-linear resistive elements 288 are stacked in series within opening 272 of tubular member 260, with one end of the stack being electrically connected to contact member 280 of the first electrical contact assembly 274. The other end of the stack is electrically connected to the intermediate electrical contact 278 via a helical compression spring 290 which holds the stack tightly together between the two electrical contacts 280 and 278.

According to the teachings of the invention, a fuse 292 is electrically connected between the intermediate electrical contact 278 and the second electrical contact assembly 276. Fuse 292 is preferably an expulsion fuse of the cartridge or the bay-o-net types, i.e., a gas blast interruption device in which a self generated gas blast arises from the rapid decomposition of the walls of the fuse chamber under the heat of the arc formed when the fuse operates. Fuse 292 has first and second electrical contacts 294 and 296 at its axial ends which are electrically connected to the intermediate contact 278 and to the second electrical contact assembly 276, respectively. For example, the first electrical contact of fuse 292 may include an axially extending stud 298 which is threadably engaged with the intermediate contact 278. The second electrical contact of fuse 292 may be in the form of a braided wire which is mechanically fastened to the metallic spool-like contact 284. For example, a stud may be welded or otherwise attached to contact 284, the braided wire may have an element which surrounds the stud, and a nut may secure the element to the stud. Contact 284 has an opening between its axial ends through which the braided wire extends, with the opening also providing a passageway for the gas generated during fuse operation to escape into the liquid dielectric 28 outside of the arrester housing 202.

Figure 3:
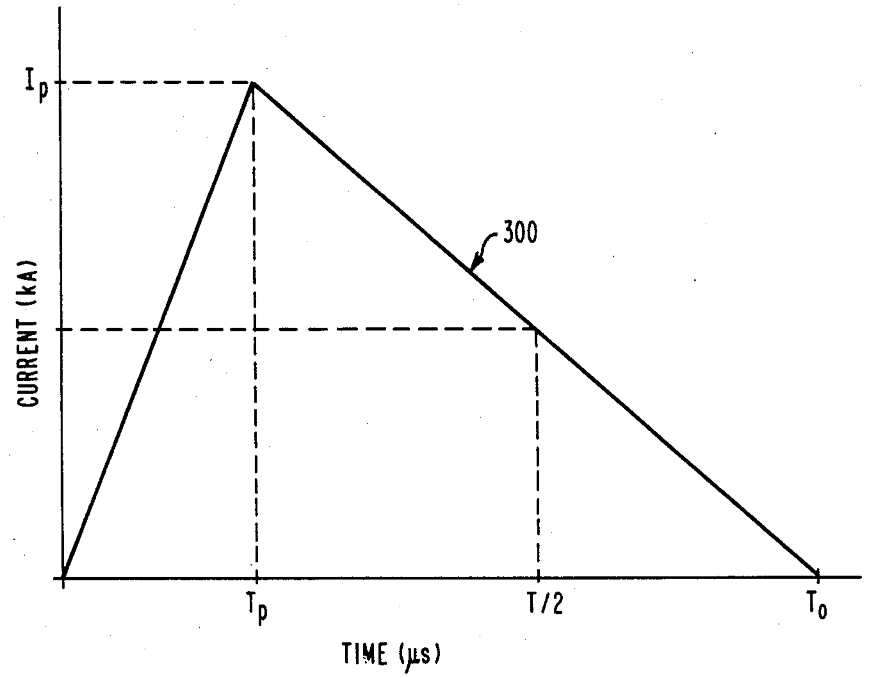
FIG. 3 is a graph of a fuse withstand curve.

FIG. 3 is a graph illustrating a fuse withstand curve 300, which aids in the understanding of how the withstand levels may be calculated to determine the minimum expulsion fuse size for fuse 292. The $I^2T$ withstand level is calculated for the user's specific application by squaring the peak current $I_p$ of the maximum expected wave 300 at the opening location of the apparatus on the user's distribution system, multiplying the result by the time $T_o$ (time to current zero in microseconds), and dividing the product by 3. If the $I^2T$ is 1066 amp$^2$ sec, for a 10 ka, 8×20 microsecond wave, for example, protective link #7 available from Westinghouse Electric Corporation may be used. The elements used in types 353 (CO8) and 358 (CO5) available from RTE Corporation may also be used, if suitably packaged, as well as simialr fuse types available from many different manufacturers. If the $I^2T$ is 4066 amp$^2$ sec, for a 20 ka, 8×20 microsecond wave, for example, Westinghouse protective link #7A may be used, as well as the elements used in RTE's types 353 (C10) or 358 (CO8).

Contact 280 of the first electrical contact assembly 274 is connected to a handle arrangement by which the arrester and fuse assembly may be inserted and removed from the arrester housing 202. For example, contact 280 may have a tapped opening coaxial with longitudinal axis 220 for receiving a shaft 302. Shaft 302 has one end threadably engaged with contact 280, and its other end is fastened to a handle portion 304 which seals the open first end 222 of metallic tubular member 210 when the draw-out portion 204 is in assembled relation with the arrester housing 202. For example, handle portion 304 may include an elastomeric, resilient stopper 306, such as a stopper formed of nitrile rubber. Stopper 306 may be expanded after insertion into the open first axial end 222, by an externally actuatable cam 308 which actuates a rod 310 connected to the stopper 306, similar to a thermos bottle top.

In summary, there has been disclosed new and improved electrical distribution apparatus, such as a pad-mounted distribution transformer, which has voltage isolation capability integral with draw-out surge protection apparatus. The integral voltage isolation makes it unnecessary to utilize a separately mounted fuse inside the tank, which is difficult and time consuming to replace, and it eliminates the need for a costly separate draw-out fuse device, which is the usual alternative to the internally mounted fuse. Unlike the protective link 31, which is in series with the high voltage primary winding 30, the fuse of the present invention is connected in parallel with the high voltage winding 30, and it carries current only when a voltage surge is accommodated by the surge arrester blocks 288. The fuse is sized to accommodate the maximum surge voltage the distribution apparatus is likely to experience on the utility line it will be associated with, passing the current associated with the wavefront without melting the fusible element of the fuse. If the arrester blocks 288 are damaged by a voltage surge and fail to completely recover their normal voltage blocking ability, the power frequency follow current will immediately operate the fuse 292 and isolate the failed arrester blocks 288 from the system voltage. While adding a fuse to the draw-out surge arrester increases the penetration of the assembly into tank 12, the use of an under-oil type fuse mounted integrally with the arrester blocks within the same tube, results in surprisingly little additional penetration measured perpendicularly to the wall 14 (measurement 312 in FIG. 2). For example, this measurement is only 11.5 inches for a 10 kv design.

I claim as my invention:

1. Electrical distribution apparatus, comprising:
an electrically grounded metallic tank,
an electrical element in said tank,
said tank having an opening therein,
and an arrester assembly including a housing, and a removable draw-out device in said housing,
said arrester housing extending into said tank via said tank opening,
said arrester housing including first and second insulatively spaced metallic means,
said draw-out device including an insulative tubular member, first and second spaced electrical contacts, a surge arrester, and a fuse,
said insulative tubular member having first and second ends, and an opening which extends between its ends, with said insulative tubular member supporting said first and second spaced electrical contacts, said surge arrester and said fuse being integrally mounted within the opening of said insulative tubular member, and serially connected between said first and said second spaced electrical contacts, said first metallic means of said housing mechanically mounting said housing to said tank and electrically connecting the first electrical contact of said draw-out device to said grounded metallic tank, said second metallic means of said housing electrically connecting the second electrical contact of said draw-out device to said electrical element, said fuse being sized to open the electrical circuit from the electrical element to the grounded metallic tank upon failure of said surge arrester to recover from a voltage surge.

2. The electrical distribution apparatus of claim 1 wherein the fuse is selected to have an $I^2t$ withstand value which, if exceeded, indicates degradation of the surge arrester.

3. The electrical distribution apparatus of claim 1 including liquid dielectric means disposed in the tank to a predetermined level, the opening in the tank is above said predetermined level, and the arrester housing extends into said liquid dielectric means such that at least the fuse is immersed therein.

4. The electrical distribution apparatus of claim 3 wherein the fuse is an expulsion fuse.

* * * * *